Dec. 11, 1934.  L. L. LUDINGTON  1,984,223
MACHINE FOR APPLYING SEALING ANNULI TO RECEPTACLE COVERS
Filed April 8, 1932  3 Sheets-Sheet 1
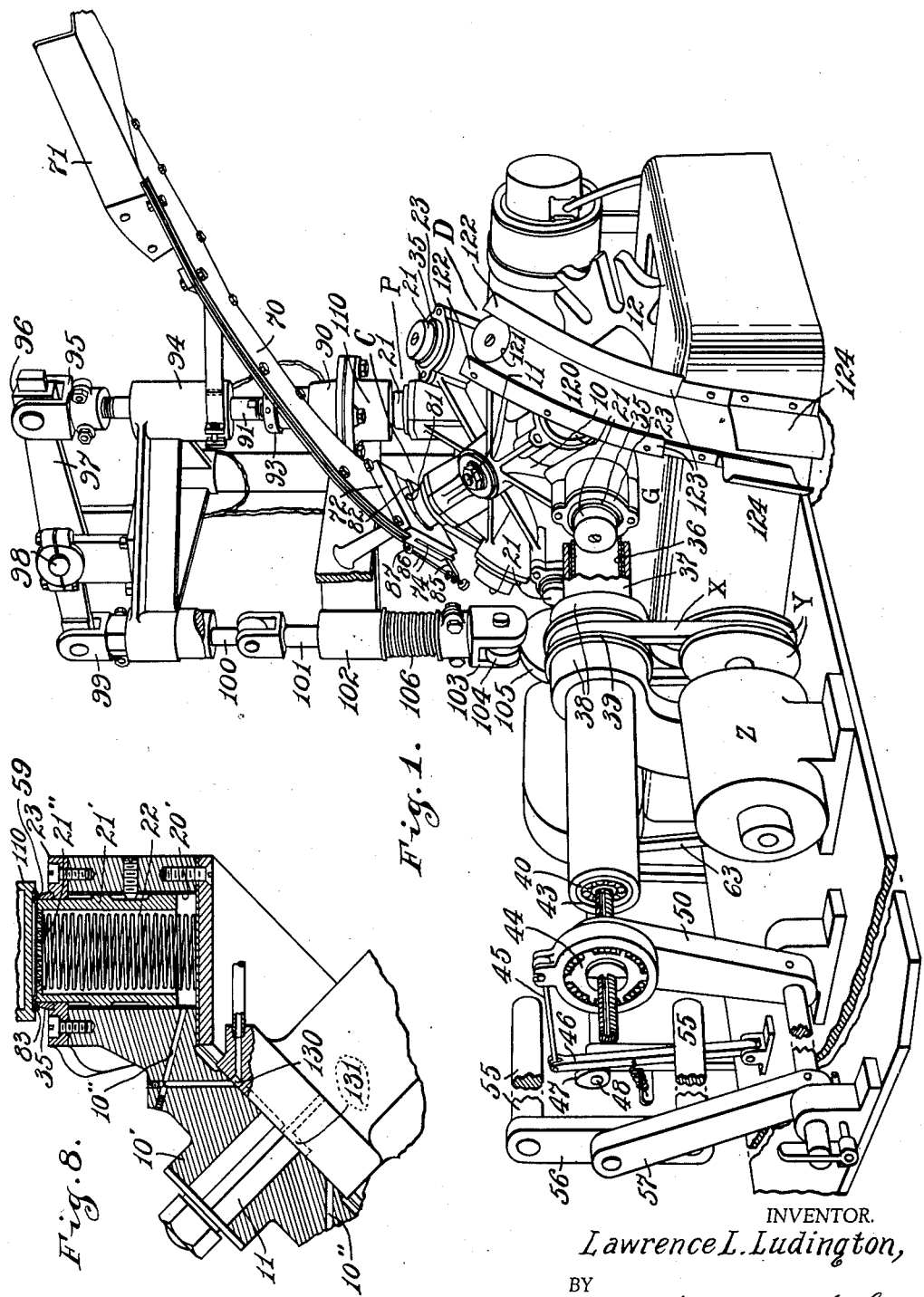
INVENTOR.
Lawrence L. Ludington,
BY
Hood + Hahn.
ATTORNEYS Dec. 11, 1934.   L. L. LUDINGTON   1,984,223
MACHINE FOR APPLYING SEALING ANNULI TO RECEPTACLE COVERS
Filed April 8, 1932   3 Sheets-Sheet 2
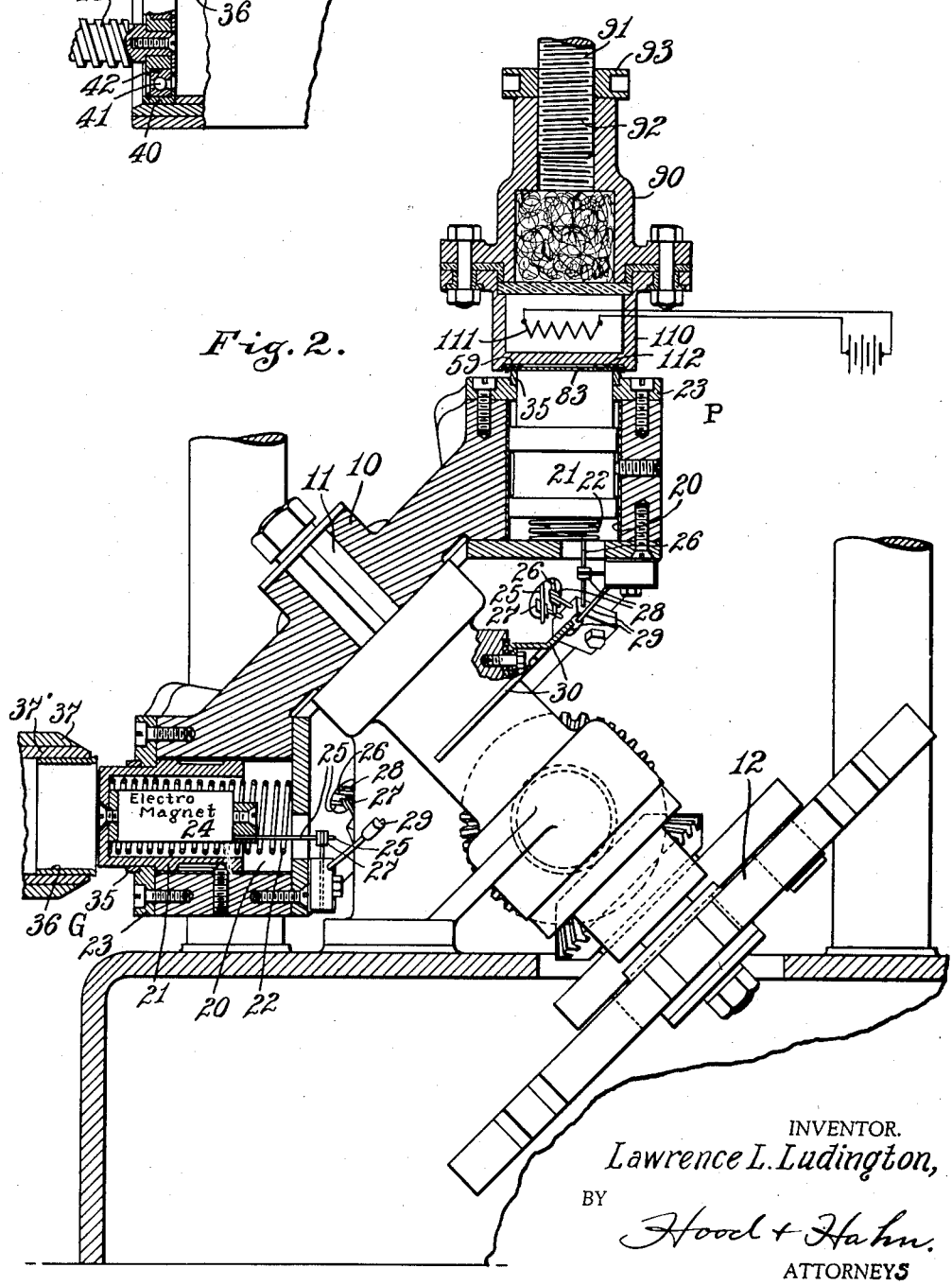
INVENTOR.
Lawrence L. Ludington,
BY
Hood + Hahn.
ATTORNEYS Dec. 11, 1934.  L. L. LUDINGTON  1,984,223
MACHINE FOR APPLYING SEALING ANNULI TO RECEPTACLE COVERS
Filed April 8, 1932   3 Sheets-Sheet 3
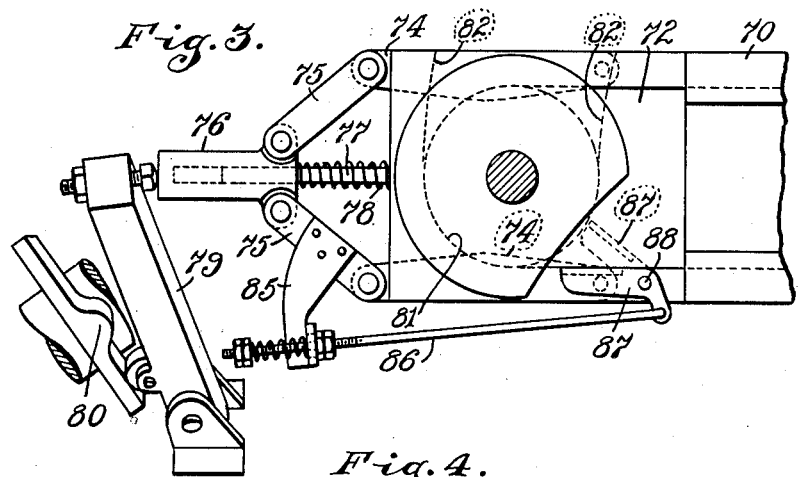
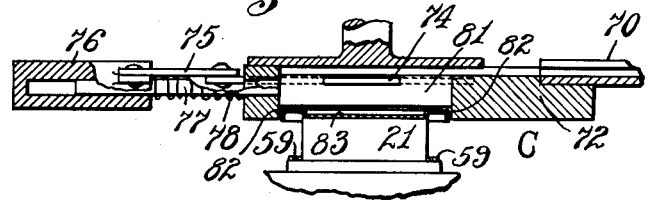
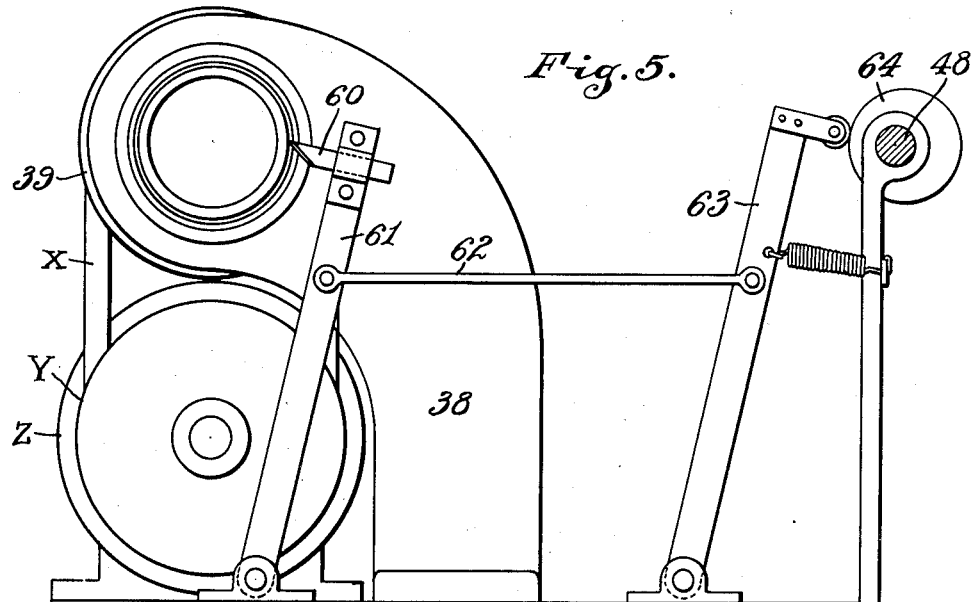
INVENTOR.
Lawrence L. Ludington,
BY
Hood + Hahn.
ATTORNEYS Patented Dec. 11, 1934

1,984,223

UNITED STATES PATENT OFFICE 1,984,223

MACHINE FOR APPLYING SEALING ANNULI TO RECEPTACLE COVERS

Lawrence L. Ludington, Muncie, Ind., assignor to Ball Brothers Company, Muncie, Ind., a corporation of Indiana Application April 8, 1932, Serial No. 604,051

16 Claims. (Cl. 113—80)

In order to pneumatically seal glass packages, such as fruit jars, by means of a metal cap, it is necessary to insert a plastic gasket between the glass and metal and in many instances it is highly desirable that the gasket be attached to the interior of the cap in such manner that the gasketed cap may be readily handled without fear of separation of the gasket from the cap.

The object of my present invention is to provide a machine by means of which metal caps may be automatically provided with suitable packing gaskets formed from preformed tubular gasket material.

The accompanying drawings illustrate my invention.

Fig. 1 is a perspective view of a machine embodying my invention; some of the parts being shown in section, somewhat conventionalized for clarity of illustration;

Fig. 2 a vertical section through the turret-head of the machine;

Fig. 3 a fragmentary plan of the discharge end of the cap-feed chute;

Fig. 4 a medial section of the parts shown in Fig. 3;

Fig. 5 an elevation, largely diagrammatic in character, of the gasket-forming mechanism;

Fig. 6 a somewhat exaggerated section of a typical form of gasketed cap;

Fig. 7 a fragmentary axial section of the receiving end of the gasket-driving tube and the associated feed plunger.

Fig. 8 an axial section showing a modified turret.

In the drawings 10 indicates a rotary turret-head carried by a shaft 11 and driven step by step by a Geneva-gear train 12 of well-known form.

Turret-head 10 is provided with a plurality of circumferentially-spaced cylindrical pockets 20, the axes of which are at angles of forty-five degrees from the axis of shaft 11 and radial from a focal point in the axis of shaft 11, the arrangement being such that each pocket, by rotation of the turret-head may be carried through successive positions, one of which places the axis of the pocket horizontally and another of which places the axis of the pocket vertically, as clearly indicated in Fig. 2. Reciprocably mounted in each pocket is a plunger 21 normally urged outwardly by spring 22, outward movement of the plunger being limited by an anvil ring 23. The plunger is hollow and preferably of non-magnetic material. Within the plunger, and carried thereby, is an electromagnet 24 having terminal fingers 25, 26 which have a sliding engagement with terminal fingers 27 and 28 respectively, one of which is grounded on the machine and the other of which is connected to a spring terminal 29 adapted to be brought, by the rotation of the turret-head into contact with an arc-shaped terminal 30 which is in a grounded energizing circuit, the arrangement being such that each electromagnet will be energized during that portion of its orbit around the axis of the turret-head from its cap-receiving position to its cap-discharging position, as will later appear.

Surrounding the exposed end of each plunger is an annular anvil 35 made of a material to which the gasket material, later to be described, will not readily adhere. Such a material is well known in the art.

The gaskets are formed by cutting short axial lengths from a preformed tube 36 which is contained and axially movable within a tubular holder 37. The tubular holder 37 is journaled in a bearing 38 and provided with a driving pulley 39 so that it may be rotated at high speed by any suitable means such, for instance, as the belt X, pulley Y and motor Z.

The normal external diameter of the gasket tube 36 is slightly less than the internal diameter of the driving tube 37 so that the gasket tube may be readily inserted into the driving tube, but, being of elastic material, when tube 37 is rotated at high speed, the gasket tube will be swelled therein by the centrifugal force so as to be firmly rotated by the driving tube.

Any suitable means may be provided to intermittently shift the gasket tube axially within the driving tube so as to project a short portion thereof into close juxtaposition with successively presented plungers 21 and the high speed rotation of the gasket tube serves to centrifugally expand and flare this projected portion.

Such a feeding means may be a ring 40 fitted within tube 37 and supported upon bearing balls 41 on a race 42 carried by one end of a feed screw 43 adapted to be axially fed by a ratchet drive mechanism 44 actuated through the medium of link 45, arm 46, cam 47 and shaft 48 synchronized with the turret-head.

The feed screw 43 and its driving ratchet are carried by an arm 50 which may be either held in position to align the feed screw with tube 37 or to shift said feed screw, and its ball-supported plunger laterally, out of alignment with the tube 37 so as to permit entry of a gasket tube into the receiving end of the driving tube 37.

To facilitate delivery of a gasket tube to the driving tube I provide a pair of mandrels 55, 55 carried by an arm 56 pivoted upon a support 57, the parts being so arranged that either one of the mandrels may be brought into axial alignment with tube 37 and a gasket tube placed thereon may be readily slipped into the driving tube, the feed plunger being temporarily laterally displaced during this operation and then returned and plunger ring 40 inserted into the receiving end of the driving tube 37 and axially shifted into engagement with the inner end of the gasket tube.

The projected end of the gasket tube 36 may be successively cut from the gasket tube by a suitable cutter blade 60 carried by a swinging arm 61 reciprocated by a link 62, arm 63 and cam 64 carried by shaft 48 synchronized with the turret-head. The projected end of the gasket tube is axially spaced a short distance from the projected end of plunger 21, as said plunger lies at station G (Figs. 1 and 2), but I have found in actual practice that, due to the high speed of rotation of the gasket tube, the projected annulus, when cut therefrom, will jump axially across this space and onto the adjacent plunger 21, shrinking upon the plunger, when its rotation is discontinued, so that the severed gasket 59 (Fig. 4) will proceed with its plunger to station C (Figs. 1 and 4), at which position a plunger 21 lies beneath the delivery end of the cap delivery chute 70 (Figs. 1, 3 and 4). The delivery chute 70 is conveniently of spiral form and forms a slotted guideway, of well-known character, leading from a feed hopper 71 to the cap discharge head 72, the caps sliding in succession into said discharge head and retained therein by latch levers 74, 74, which underlie the end cap, as clearly indicated in Fig. 3. The latch levers 74 are manipulated by means of links 75, 75 which are actuated by reciprocation of a head 76 slidably mounted upon a pin 77 and normally biased to cap-retaining position by spring 78. Head 76 is intermittently shifted (to the right Fig. 3) against the bias of spring 78 by a lever 79 intermittently actuated by a cam 80 which is synchronized with the turret-head.

One of the links 75 carries an arm 85 through which is projected a link 86, the far end of which is connected to a swinging cap retainer 87 pivoted at 88, the arrangement being such that, as latches 74 are retracted from cap-retaining position, the cap retainer 87 will swing into a blocking position where it will block the next on-coming cap, as indicated in dotted lines in Fig. 3. The discharge head 72 is perforated, beneath fingers 74 as indicated at 81 and transversely channeled on its under face, as indicated by dotted lines in Fig. 3 to form guide walls 82 for the cover cap 83 to center said cap upon the adjacent plunger 21.

Arranged in vertical alignment above station P (Fig. 1) of the turret-head, at which point plungers 21 are brought to a vertical position, is a pressure head 90 axially adjustable on rod 91 by means of threads 92 and check nut 93. Rod 91 is axially shiftable through bearing 94 carried by the main frame of the machine and is connected by yoke 95 with a block 96 slidably mounted upon one end of a cross beam 97 pivoted at 98 on the main frame. The opposite arm of beam 97 is engaged by a yoke 99 carried by the upper end of rod 100, the lower end of which is connected to the upper end of a rod 101 reciprocable in a bearing 102, the lower end of said rod 101 carrying a yoke 103 in which is journaled a roller 104 riding on a cam 105 which is sychronized with the turret-head. A spring 106 holds roller 104 in contact with cam 105 and normally biases the pressure head 90 toward its upper and inactive position.

The pressure head 90 carries a pressure block 110 which is kept heated by any suitable means, such for instance as an electric heating element 111, indicated diagrammatically in Fig. 2. The lower face of the pressure block 110 is pocketed, as indicated at 112, to receive and impart heat to the cover caps 83 as they are presented thereto by the plungers 21, driving said caps, and their subjacent plungers 21 downwardly so as to compress the plastic gaskets between the cap and the subjacent anvil ring 35 and, by reason of the heat imparted to the gasket through the cover cap cause the gaskets to stick to the caps.

Arranged at station D (Fig. 1), ninety degrees from station P, at which position the axes of the plungers 21 are at an angle of forty-five degrees to both the horizontal and vertical, is the receiving end of a discharge chute comprising a curved plate 120 notched at 121 and overlaid at its sides by strips 122.

The electromagnets are energized just before they reach station C and energization is discontinued just as plungers 21 reach station D, at which time the cover caps are in a position to slide readily from the plungers onto plate 120 and beneath guide strips 122. The lower end of plate 120 is warped into a substantially vertical plane and strips 122 are discontinued at the upper end of this vertical portion, as indicated at 123 (Fig. 1) and adjacent the floor there are provided a pair of substantially vertical opposed curved walls 124, 124 which form a pocket into which the completed cover caps are delivered.

In operation the turret-head is advanced step by step. Each plunger 21, as it stands momentarily at station G receives a gasket annulus cut from the exposed end of the tube of gasket material. Each plunger 21 is then brought to station C, where it receives a cover cap 83 from the feed chute head 72 and is retained thereon by the magnetism of the energized electromagnet, being centered on the plunger 21 by the walls 82. Each plunger 21 then proceeds to station P where it is centered beneath the pressure block 110 and said pressure block is urged downwardly to compress the gasket material between the subjacent anvil ring 35 and cap 83, cap 83 being heated sufficiently during this period to soften the upper face of the gasket ring so that it will adhere to the cover cap. The pressure head having been thereupon withdrawn upwardly, the turret is advanced step by step and when the cover cap, with its attached gasket, reaches station D, the contact 29 relating to plunger 21 then at this station, is withdrawn from terminal 30 so that the electromagnet thereof is deenergized, whereupon the completed cover cap slides from the plunger 21 onto plate 120, sliding downwardly until it passes the lower ends of strips 122 and is inverted into the receptacle formed by the curved plates 124, 124, the inversion being due to the fact that the upper part of the cap, just as it emerges from beneath strips 122, possesses a slight horizontal force component sufficient to produce the inversion.

It will be readily understood that, instead of electro-magnets within the plungers 21 for providing a magnetic force for retaining the cover caps upon the plungers, there may be substituted other holding means, such for instance, as pneumatic means.

Such means is indicated in Fig. 8, where the turret 10' is provided with closed cylinders 20' in which are mounted plungers 21' biased outwardly by springs 22, and having perforated outer heads as indicated at 21''. Each cylinder 20' is ported, through a passage 10'' to register with suction port 130, connected to a suitable exhausting means (not shown), and an exhaust port 131 leading to atmosphere, port 130 extending through an arc from just before station C to just before station D, and port 131 being positioned adjacent station D.

It should also be understood that, instead of the automatic means which I have shown for producing successive annular gaskets and placing the same around the exposed ends of the plungers 21, previously formed gaskets may be placed by hand upon said plungers, and that the described means for successively cutting annuli from an elastic tube may be separately used for producing a supply of annular gaskets. Tube 37 may have a lining 37' to facilitate sliding the gasket tube 36.

I claim:

1. In a device for associating an annular preformed gasket with a cover cap, a rotary turret, a plunger carried by said turret and axially shiftable on an axis lying at an angle to the axis of the turret, a gasket anvil carried by the turret and surrounding the plunger, means for rotating the turret to carry the plunger through successive stations, cap-retaining means associated with the plunger to retain the cap thereon through a limited portion of the travel of the turret, cap-engaging means for engaging the cap in opposition to the anvil, and means synchronized with the turret for intermittently reducing the axial distance between said cap-engaging means and anvil to cause adherence with the cap of a preformed annular gasket interposed between anvil and cap.

2. In a device for associating an annular preformed gasket with a cover cap, a rotary turret, a plunger carried by said turret and axially shiftable on an axis lying at an angle to the axis of the turret, a gasket anvil carried by the turret and surrounding the plunger, means for rotating the turret to carry the plunger through successive stations, cap-retaining means associated with the plunger to retain the cap thereon through a limited portion of the travel of the turret, cap-engaging and heating means for engaging the cap in opposition to the anvil, and means synchronized with the turret for intermittently reducing the axial distance between said cap-engaging means and anvil to cause adherence with the cap of a preformed annular gasket interposed between anvil and cap.

3. In a device for associating an annular preformed gasket with a cover cap, a rotary turret, a plunger carried by said turret and axially shiftable on an axis lying at an angle to the axis of the turret, a gasket anvil carried by the turret and surrounding the plunger, means for rotating the turret to carry the plunger through successive stations, cap-retaining means associated with the plunger to retain the cap thereon through a limited portion of the travel of the turret, cap-engaging means for engaging the cap in opposition to the anvil, means synchronized with the turret for intermittently reducing the axial distance between said cap-engaging means and anvil to cause adherence with the cap of a preformed annular gasket interposed between anvil and cap, a rotary tube axially aligned with one position of the plunger and having an internal diameter slightly greater than a tube of suitable gasket material having an internal diameter associable with the plunger and anvil, means by which said rotary tube may be rotated at a speed sufficient to cause the tube of gasket material to centrifugally swell into frictional contact with the interior of said rotary tube, means synchronized with the turret for intermittently advancing the tube of gasket material axially through the rotary tube, a cutter arranged adjacent the delivery end of the rotary tube, and means synchronized with the turret for moving the cutter transversely of the delivery end of the rotary tube.

4. In a device for associating an annular preformed gasket with a cover cap, a rotary turret, a plunger carried by said turret and axially shiftable therein, a gasket anvil carried by the turret and surrounding the plunger, means for rotating the turret to carry the plunger through successive steps, cap-retaining means associated with the plunger to retain the cap thereon through a limited portion of the travel of the turret, cap-engaging means for engaging the cap in opposition to the anvil, and means synchronized with the turret for intermittently reducing the axial distances between said cap-engaging means and anvil to cause adherence with a cap of a preformed annular gasket interposed between anvil and cap.

5. In a device for associating an annular preformed gasket with a cover cap, a rotary turret, a plunger carried by said turret and axially shiftable therein, a gasket anvil carried by the turret and surrounding the plunger, means for rotating the turret to carry the plunger through successive steps, cap-retaining means associated with the plunger to retain the cap thereon through a limited portion of the travel of the turret, cap-engaging means for engaging the cap in opposition to the anvil, means synchronized with the turret for intermittently reducing the axial distance between said cap-engaging means and anvil to cause adherence with a cap of a preformed annular gasket interposed between anvil and cap, a rotary tube axially aligned with one position of the plunger and having an internal diameter slightly greater than a tube of suitable gasket material having an internal diameter associable with the plunger and anvil, means by which said tube may be rotated at a speed sufficient to cause the tube of gasket material to centrifugally swell into frictional contact with the interior of said rotary tube, means synchronized with the turret for intermittently advancing the tube of gasket material axially through the rotary tube, a cutter arranged adjacent the delivery end of the rotary tube, and means synchronized with the turret for moving the cutter transversely of the delivery end of the rotary tube.

6. In a device for associating an annular preformed gasket with a cover cap, a rotary turret, a plunger carried by said turret and axially shiftable therein, a gasket anvil carried by the turret and surrounding the plunger, means for rotating the turret to carry the plunger through successive stations, an electromagnet arranged within the plunger, means synchronized with the turret by which said magnet may be energized through a limited portion of the orbit of the plunger around the axis of the turret, cap-engaging means for engaging the cap in opposition to the anvil, and means synchronized with the turret for intermittently reducing the axial distance between said cap-engaging means and anvil to cause adherence with the cap of a preformed annular gasket interposed between the anvil and cap.

7. In a device for associating an annular preformed gasket with a cover cap, a rotary turret, a plunger carried by said turret and axially shiftable therein on an axis lying at an angle to the axis of the turret, a gasket anvil carried by the turret and surrounding the plunger, means for rotating the turret to carry the plunger through successive stations, an electromagnet arranged within the plunger, means synchronized with the turret by which said magnet may be energized through a limited portion of the orbit of the plunger around the axis of the turret, cap-engaging means for engaging the cap in opposition to the anvil, and means synchronized with the turret for intermittently reducing the axial distance between said cap-engaging means and anvil to cause adherence with the cap of a preformed annular gasket interposed between the anvil and cap.

8. In a device for associating an annular preformed gasket with a cover cap, a rotary turret, a plunger carried by said turret and axially shiftable therein, a gasket anvil carried by the turret and surrounding the plunger, means for rotating the turret to carry the plunger through successive stations, an electromagnet arranged within the plunger, means synchronized with the turret by which said magnet may be energized through a limited portion of the orbit of the plunger around the axis of the turret, cap-engaging means for engaging the cap in opposition to the anvil, and means synchronized with the turret for intermittently reducing the axial distance between said cap-engaging means and anvil to cause adherence with the cap of a preformed annular gasket interposed between the anvil and cap.

9. In a device for associating an annular preformed gasket with a cover cap, a rotary turret, a plunger carried by said turret and axially shiftable therein on an axis lying at an angle to the axis of the turret, a gasket anvil carried by the turret and surrounding the plunger, means for rotating the turret to carry the plunger through successive stations, an electromagnet arranged within the plunger, means synchronized with the turret by which said magnet may be energized through a limited portion of the orbit of the plunger around the axis of the turret, cap-engaging means for engaging the cap in opposition to the anvil, and means synchronized with the turret for intermittently reducing the axial distance between said cap-engaging means and anvil to cause adherence with the cap of a preformed annular gasket interposed between the anvil and cap.

10. In a device for associating an annular preformed gasket with a cover cap, a rotary turret, an air cylinder carried by the turret and ported for intermittent connection with subatmosphere and atmosphere, a plunger mounted in said cylinder and having a perforated exposed end, a gasket anvil carried by the turret and surrounding the exposed end of the plunger, means for rotating the turret to carry the plunger through successive stations, cap-engaging means for engaging the cap in opposition to the anvil, and means synchronized with the turret for intermittently reducing the axial distance between said cap-engaging means and anvil to cause adherence with the cap of a preformed annular gasket interposed between the anvil and cap.

11. In a device for associating an annular preformed gasket with a cover cap, a rotary turret, an air cylinder carried by the turret and ported for intermittent connection with subatmosphere and atmosphere, a piston mounted in said cylinder and having a perforated exposed end, a gasket anvil carried by the turret and surrounding the exposed end of the plunger, means for rotating the turret to carry the plunger through successive stations, cap-engaging and heating means for engaging the cap in opposition to the anvil, and means synchronized with the turret for intermittently reducing the axial distance between said cap-engaging means and anvil to cause adherence with the cap of a preformed annular gasket interposed between the anvil and cap.

12. Gasket-forming means comprising a rotary tube adapted to receive internally a tube of flexible packing material, means by which said tube may be rotated about its axis to cause a tube of flexible material of suitable diameter placed therein to centrifugally swell into said tube, a plunger mounted in said rotary tube and axially shiftable therethrough, and a cutter shiftable transversely of the delivery end of the rotary tube.

13. Gasket-forming means comprising a rotary tube adapted to receive internally a tube of flexible packing material, means by which said tube may be rotated about its axis to cause a tube of flexible material of suitable diameter placed therein to centrifugally swell into said tube, a plunger mounted in said rotary tube and axially shiftable therein, a cutter shiftable transversely of the delivery end of the rotary tube, and a rotary turret having a gasket-receiving element alignable with the delivery end of the rotary tube.

14. The combination of a tube mounted for rotation about its axis and adapted to telescopically receive a tube of elastic gasket-forming material, means by which said tube may be rotated at an angular velocity sufficient to cause the tube of gasket-forming material to swell into frictional engagement with the rotary tube, a rotary turret having a gasket-receiving element alignable by rotation of the turret with the mouth of the rotary tube, means synchronized with the turret for feeding the gasket-forming tube axially of the rotary tube, a cutter movable transversely across the mouth of the rotary tube, and means synchronized with the turret for traversing said cutter through the wall of a projected portion of the gasket-forming tube.

15. In a device for associating cover caps and predetermined annular gaskets, a rotary turret, an annular series of circumferentially-spaced cap-receiving plungers carried by said turret, an annular series of circumferentially-spaced gasket anvils, one surrounding each plunger, a rotary tube mounted for rotation about an axis with which the plungers may be successively axially aligned by rotation of the turret, means by which said rotary tube may be rotated at an angular velocity sufficient to cause a tube of elastic gasket-forming material to radially swell therein, means synchronized with the turret to intermittently project such a gasket-material tube from the rotary tube, a cutter associated with the mouth of said rotary tube, means synchronized with the turret to cause said cutter to traverse across the mouth of said rotary tube, cap-engaging means so arranged that the plungers may be brought into successive alignment therewith, and means synchronized with the turret for intermittently reducing the axial distance between said cap-engaging means and a gasket-anvil aligned therewith.

16. In a device for associating cover caps and preformed annular gaskets, a rotary turret, an annular series of circumferentially-spaced cap-receiving plungers carried by said turret on axes converging upon the axis of the turret, an annular series of circumferentially-spaced gasket anvils, one surrounding each plunger, a rotary tube mounted for rotation about an axis with which the plunger may be successively axially aligned by rotation of the turret, means by which said rotary tube may be rotated at an angular velocity sufficient to cause a tube of elastic gasket-forming material to radially swell therein, means synchronized with the turret to intermittently project such a gasket-material tube from the rotary tube, a cutter associated with the mouth of said rotary tube, means synchronized with the turret to cause said cutter to traverse across the mouth of said rotary tube, cap-engaging means so arranged that the plungers may be brought into successive alignment therewith, and means synchronized with the turret for intermittently reducing the axial distance between said cap-engaging means and a gasket anvil aligned therewith.

LAWRENCE L. LUDINGTON.